May 7, 1963  R. W. TRIPP ETAL  3,088,368
VARIABLE MAGNIFICATION OPTICAL SYSTEM
Filed Jan. 15, 1959  4 Sheets-Sheet 1
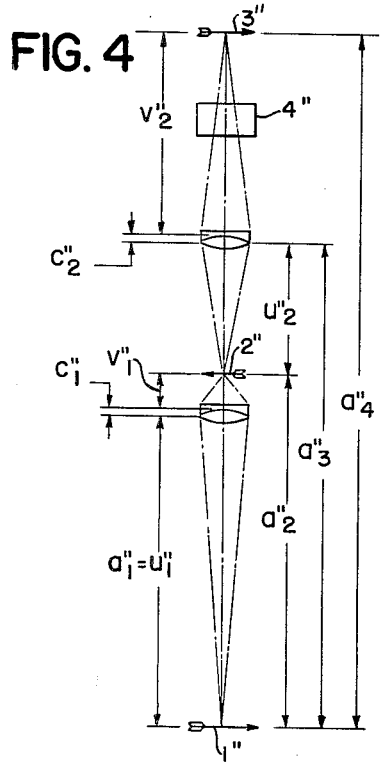
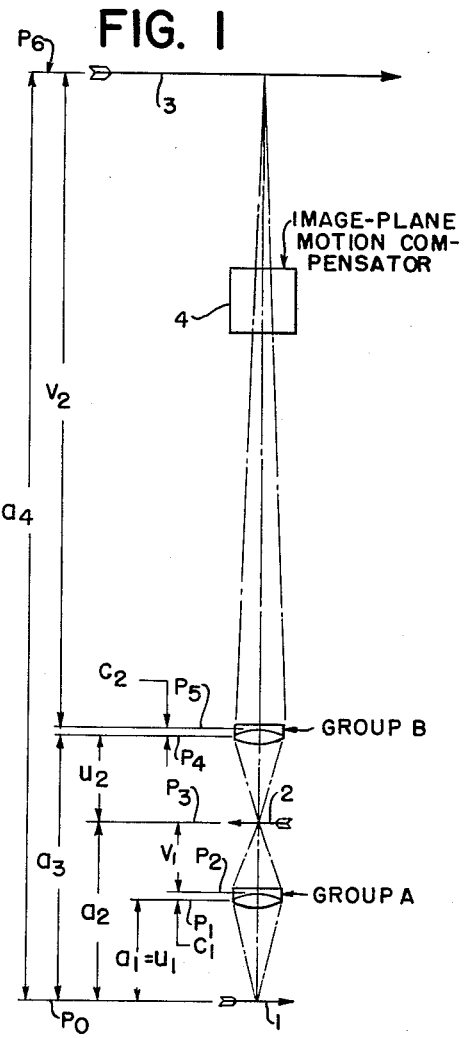
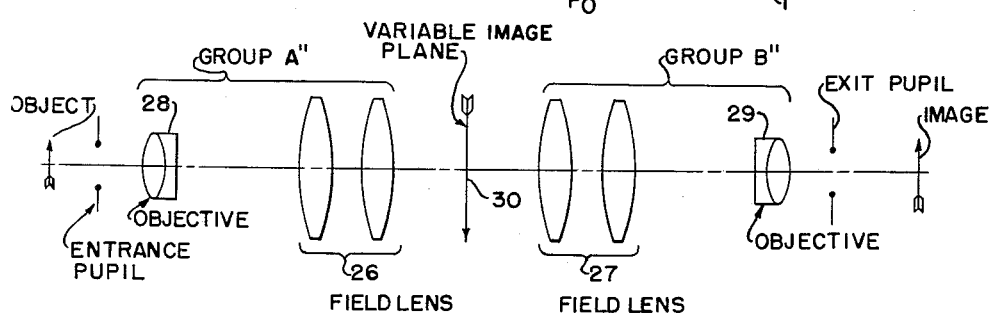
INVENTORS
ROBERT W. TRIPP
EARLE B. BROWN
MARTIN SHENKER
BY
Pennie, Edmonds, Morton, Barrows & Taylor
ATTORNEYS

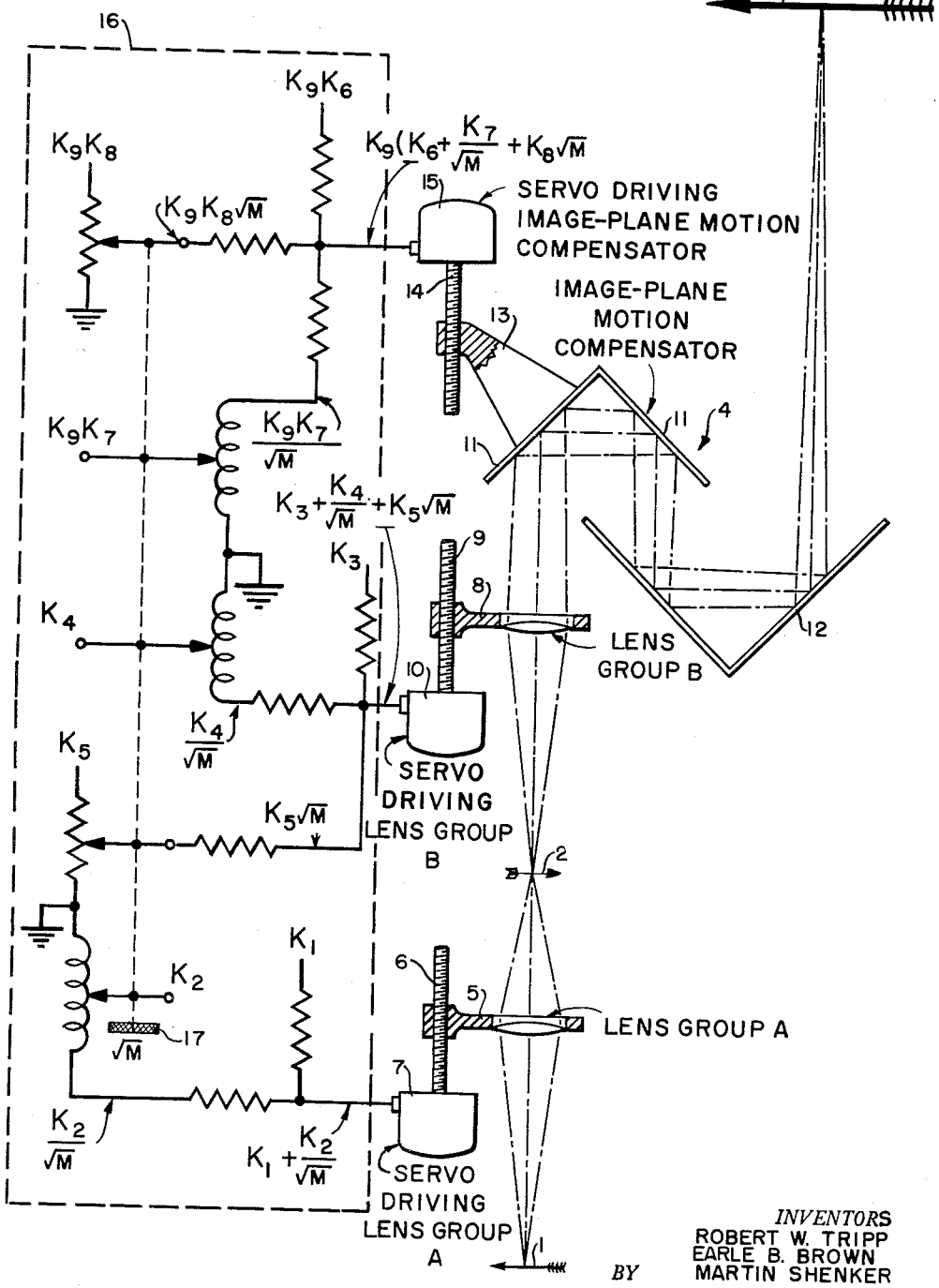

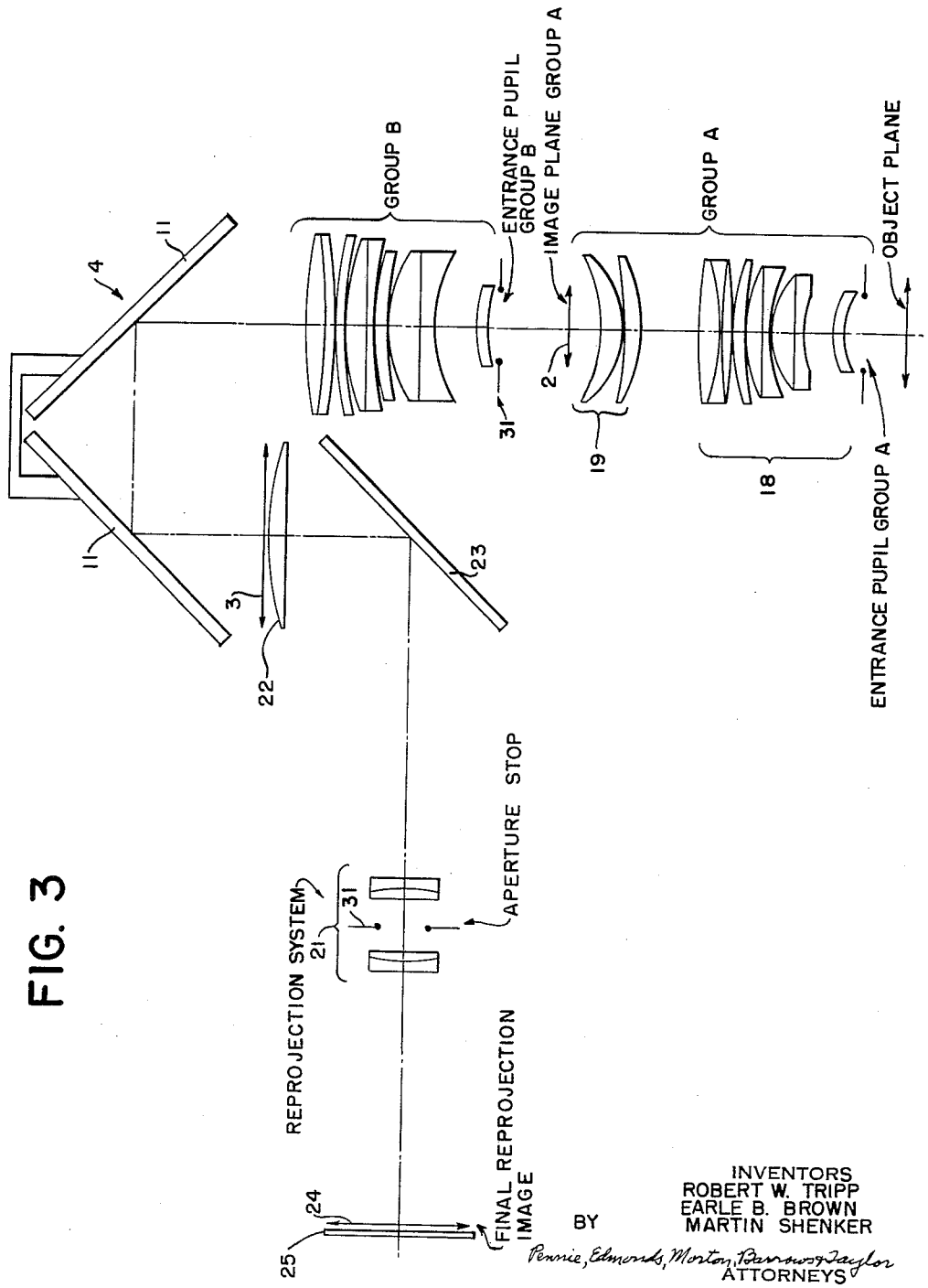

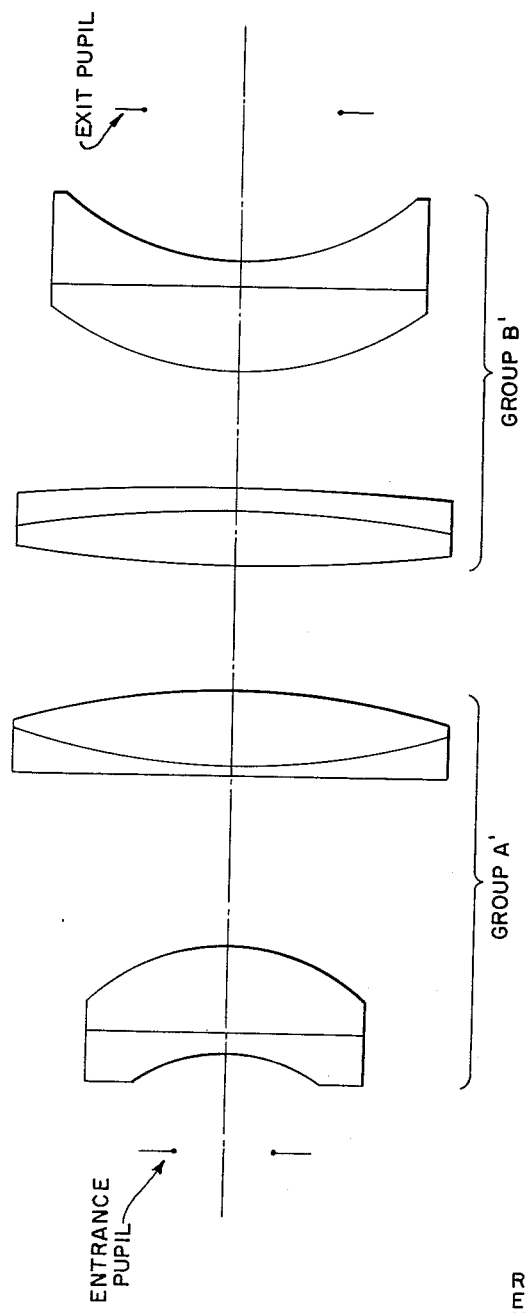

3,088,368
VARIABLE MAGNIFICATION OPTICAL SYSTEM
Robert W. Tripp, Bronxville, N.Y., Earle B. Brown, Bergenfield, N.J., and Martin Shenker, Monsey, N.Y., assignors to Farrand Optical Co., Inc., New York, N.Y., a corporation of New York
Filed Jan. 15, 1959, Ser. No. 787,064
21 Claims. (Cl. 88—57)

The invention relates to variable magnification optical systems, and more particularly to a variable magnification optical system which provides a very large range of magnification for a large field of view and wide aperture.

A variable magnification optical system is understood in the art to be an optical system in which changes in the positions of optical components along the axis of the system introduce changes in the magnification at which a given object is imaged in the final image plane of the system. Since this would be true for any random collection of optical components on a common axis, the term "variable magnification optical system" also implies a system which has been so designed and constructed as to maintain a reasonable degree of correction of the various aberrations for a useful range of magnification change.

Variable magnification optical systems so far available from the prior art consist, in general, of a multiplicity of optical components distributed about a central aperture stop. Most of these are designed for application to an infinitely distance object, as for photographic purposes, and have a useful range of magnification change of about 3-to-1, although designs having a range of as much as 6-to-1 have recently become available. The present invention provides a system having a useful range of magnification change much greater than this and at the same time maintaining focus of a near or distant object. For example, such results have been successfully attained with a total magnification range of 25-to-1. The basic principle of the invention is such that ranges as great as 50-to-1 or even 100-to-1 are feasible.

The magnitude and significance of this improvement are evident upon consideration of the restrictions on the useful range of magnification implicit in designs previously available, which are principally three in number: (1) The magnitude of the changes in spacing which may be permitted and still retain the image quality are severely limited because the movement of the optical components along the optical axis necessary to cause a variation in magnification affect the aberrations of the system to a marked degree; (2) the size of the light bundle which may be passed through the entrance pupil and through the successive apertures in the system is severely restricted because the various images of the entrance pupil which are formed successively by the optical components are changed in size and location by considerable amounts as a result of the movement of the optical components; and (3) for the latter reason also, the field of view which may be covered by full range of magnification change is severely restricted. It will become evident as the description proceeds that those limitations are substantially overcome in the system of this invention.

Among the many advantages and improvements introduced by the present invention may be listed the following: The invention provides A variable magnification optical system having an extremely wide range of useful magnification over which a high degree of optical correction for spherical aberration, chromatic aberration, coma, astigmatism, distortion, curvature of field, and lateral color is achieved;

A variable magnification optical system with an extremely wide range of useful magnification which is adapted not only for the imaging of distant objects, but for projection and reprojection of close objects, such as maps, transparencies, and the like;

A variable magnification optical system with an extremely wide range of useful magnification which, at the same time, covers a large field of view, for example of the order of 60°; and A variable magnification optical system with an extremely wide range of useful magnification which, at the same time, can operate at a high effective relative aperture, for example of the order of $f/2$.

Further advantages of the invention will be apparent from the descriptions of the principles thereof, and of three different embodiments which follow.

Basically, the invention comprising two separate groups of optical components distributed along an optical axis about an internal image plane. The optical components of the first group form a real image of the object in a first image plane at a conjugate distance which would usually be small with respect to the distance of the object but not necessarily so. Therefore this image would usually be reduced in size. The optical components of the second group utilize for their object the image formed by the first group, and from this object form a magnified image in a second image plane, of which the conjugate distance is large with respect to the object distance. In order to achieve variation in magnification of the overall system, both groups of optical components are moved with respect to the first or original object, and also with respect to each other; and, unless compensation is introduced, the location of the final image plane also moves with respect to the other components of the system.

In moving the two groups of components with respect to the original object and with respect to each other, the individual components within the separate groups are not moved with respect to each other, but each group is moved as a whole. As a result, the only change in separation between optical components occasioned as a result of the movement is a change in the separation of the first group with respect to the second group. This particular separation has little effect on the aberrational performance of the system, and thus it is possible to achieve a high degree of optical correction for a large aperture and a wide field of view. At the same time, the arrangement of the system in the form of two fixed groups of optical components with a real image plane lying within them, in which an image of the original object is formed at a reduced size, makes the change in separation of the groups quite small with respect to the changes in magnification which are accomplished, thereby making it possible to maintain adequate optical quality and illumination over an extremely wide range of magnification values.

In most embodiments of the invention, including those herein described, it is desirable to introduce into the optical path, for example between the second group of optical components and the final image plane, a device for compensating the change in the position of the final image with respect to the original object in order to maintain the final image plane in a fixed location. Although this compensation is not a necessary part of the invention, it is usually a convenience and in some cases essential in practical applications of the invention.

A more complete understanding of the invention will be had from consideration of the following description considered in connection with the accompanying drawings, in which:

FIG. 1 is an elementary optical diagram showing the relative positions of the basic components of the invention for a magnification of 5×;

FIG. 2 is a schematic diagram of a complete system according to the invention which includes the two basic optical groups, an image-plane motion compensator, and means providing the necessary movements of these three movable elements including a simple electrical computer for deriving the necessary electric signals to actuate the driving means;

FIG. 3 is an optical diagram of a practical embodiment of the invention showing the various component lenses and also a system for reprojecting a final image;

FIG. 4 is an elementary optical diagram of the relative positions of basic components corresponding to FIG. 1 for a magnification of unity;

FIG. 5 is an optical diagram of a modified embodiment of the invention; and

FIG. 6 is an optical diagram of an alternative modification of considerably reduced optical complexity.

Referring now to FIG. 1, the two optical groups, A and B, are represented in elementary diagrammatic form for purposes of explanation. Each group of optical components may be represented by a pair of principal planes $P_1$, $P_2$ and $P_4$, $P_5$, respectively, each pair separated by fixed and computable distances $C_1$ and $C_2$, respectively, from which may be measured the object and image distances and the effective focal lengths of the groups. The magnification produced by specified arrangements of the groups may be computed from these measured distances in an exact manner.

The quantities indicated in FIG. 1 are defined as follows:

$u_1 (=a_1)$ is the distance from the first principal plane $P_1$ of group A to the original object plane $P_0$.

$v_1$ is the distance from the second principal plane $P_2$ of group A to the plane $P_3$ of the real image 2 which it forms of the original object 1.

$u_2$ is the distance from the first principal plane $P_4$ of group B to the plane $P_3$ of the image 2 formed by group A.

$v_2$ is the distance from the second principal plane $P_5$ of group B to the image 3 formed by it in the final image plane $P_6$ of the system.

$a_2$ is the distance from the original object plane $P_0$ to the real image 2 formed by group A.

$a_3$ is the distance from the original object plane $P_0$ to the first principal plane $P_4$ of group B.

$a_4$ is the distance from the original object plane $P_0$ to the final image plane $P_6$ of the system.

$C_1$ is the distance between the first principal plane $P_1$ and the second principal plane $P_2$ of group A.

$C_2$ is the distance between the first principal plane $P_4$ and the second principal plane $P_5$ of group B.

$f_A$ is the effective focal length of group A.

$f_B$ is the effective focal length of group B.

$m_A$ is the magnification between the original object 1 and the image 2 formed by group A.

$m_B$ is the magnification between the image 2 formed by group A (the object for group B) and the final image 3 formed by group B.

M is the overall magnification of the system between the original object 1 and the final image 3.

The required movements of group A and group B are determined, according to the invention, as follows:

From the general laws of image formation, $$\frac{1}{u_1}+\frac{1}{v_1}=\frac{1}{f_A} \quad (1)$$

$$\frac{1}{u_2}+\frac{1}{v_2}=\frac{1}{f_B} \quad (2)$$

$$m_A=\frac{v_1}{u_1}$$

hence $v_1 = m_A u_1$ or $$u_1=\frac{v_1}{m_A} \quad (3)$$

$$m_B=\frac{v_2}{u_2}$$

hence $v_2 = m_B u_2$ or $$u_2=\frac{v_2}{m_B} \quad (4)$$

also, $M = m_A m_B \quad (5)$

By substitution from (3), Equation 1 may be written $$u_1=f_A\left[\frac{m_A+1}{m_A}\right] \quad (6)$$

or $v_1 = f_A[m_A+1] \quad (7)$ and by substitution from (4), Equation 2 may be written $$u_2=f_B\left[\frac{m_B+1}{m_B}\right] \quad (8)$$

or $v_2 = f_B[m_B+1] \quad (9)$

From (5) above $M = m_A m_B$.

The distribution of the total magnification M between $m_A$ and $m_B$ is completely arbitrary, so long as (5) is satisfied.

From this it follows that, in the general case, $$m_A = aM^N \quad (10)$$
$$m_B = bM^{1-N} \quad (11)$$

where $ab=1$, and N is any real number.

Equation 6 then becomes $$u_1=f_A\left[1+\frac{1}{aM^N}\right]=f_A+\frac{f_A}{a}\left(\frac{1}{M^N}\right) \quad (12)$$

Equation 7 then becomes $$v_1=f_A[1+aM^N]=f_A+f_A a(M^N) \quad (13)$$

Equation 8 becomes $$u_2=f_B\left[1+\frac{1}{bM^{1-N}}\right]=f_B+\frac{f_B}{b}\left(\frac{1}{M^{1-N}}\right) \quad (14)$$

Equation 9 becomes $$v_2=f_B[1+bM^{1-N}]=f_B+f_B b(M^{1-N}) \quad (15)$$

The quantities $a_1$, $a_2$, $a_3$ and $a_4$ may now be determined as follows:

$$a_1=u_1=f_A+\frac{f_A}{a}\left(\frac{1}{M^N}\right) \quad (16)$$

$$a_2=a_1+c_1+v_1=2f_A+\frac{f_A}{a}\left(\frac{1}{M^N}\right)+f_A a(M^N)+c_1 \quad (17)$$

$$a_3=a_2+u_2=2f_A+f_B+\frac{f_A}{a}\left(\frac{1}{M^N}\right)+\frac{f_B}{b}\left(\frac{1}{M^{1-N}}\right)$$
$$+f_A a(M^N)+c_1 \quad (18)$$

$$a_4=a_3+c_2+v_2=2f_A+2f_B+\frac{f_A}{a}\left(\frac{1}{M^N}\right)+\frac{f_B}{b}\left(\frac{1}{M^{1-N}}\right)$$
$$+f_A a(M^N)+f_B b(M^{1-N})+c_1+c_2 \quad (19)$$

A convenient distribution is represented by $$m_A = a\sqrt{M} \quad (20)$$
$$m_B = b\sqrt{M} \quad (21)$$

where $ab=1$; and corresponding to $N=\frac{1}{2}$ in Equations 10 and 11.

Equation 6 then becomes $$u_1=f_A\left[1+\frac{1}{a\sqrt{M}}\right]=f_A+\frac{f_A}{a}\left[\frac{1}{\sqrt{M}}\right] \quad (22)$$

Equation 7 becomes $$v_1 = f_A[1+a\sqrt{M}] = f_A + f_A a[\sqrt{M}] \quad (23)$$

Equation 8 becomes $$u_2 = f_B\left[1+\frac{1}{b\sqrt{M}}\right] = f_B + \frac{f_B}{b}\left[\frac{1}{\sqrt{M}}\right] \quad (24)$$

and Equation 9 becomes $$v_2 = f_B[1+b\sqrt{M}] = f_B + f_B b\sqrt{M} \quad (25)$$

The quantities $a_1$, $a_2$, $a_3$, and $a_4$ may now be determined as follows:

$$a_1 = u_1 = f_A + \frac{f_A}{a}\left[\frac{1}{\sqrt{M}}\right] \quad (26)$$

$$a_2 = a_1 + c_1 + v_1 = 2f_A + \frac{f_A}{a}\left[\frac{1}{\sqrt{M}}\right] + f_A a[\sqrt{M}] + c_1 \quad (27)$$

$$a_3 = a_2 + u_2 = 2f_A + f_B + \left[\frac{f_A}{a} + \frac{f_B}{b}\right]\left[\frac{1}{\sqrt{M}}\right] + f_A a[\sqrt{M}] + c_1 \quad (28)$$

$$a_4 = a_3 + c_2 + v_2 = 2f_A + 2f_B + \left[\frac{f_A}{a} + \frac{f_B}{b}\right]\left[\frac{1}{\sqrt{M}}\right]$$

$$+ [f_A a + f_B b][\sqrt{M}] + c_1 + c_2 \quad (29)$$

From Equation 26 it is seen that the movement required of group A is proportional to the change in the quantity $$\frac{1}{\sqrt{M}}$$

and from Equation 28 it is seen that the movement required of group B is the sum of two movements, one proportional to the change in the quantity $$\frac{1}{\sqrt{M}}$$

and the other proportional to the change in the quantity $\sqrt{M}$. Therefore, it may be said that the movement required of group B is proportional to the change in the quantity $$\left[\frac{K}{\sqrt{M}} + \sqrt{M}\right]$$

where K is a constant depending upon the values of the quantities $f_A$, $f_B$, $a$ and $b$ which are defined above. It is also seen that the movement required at the final image plane 3 is the sum of two movements, one proportional to the change in the quantity $$\frac{1}{\sqrt{M}}$$

and the other proportional to the change in the quantity $\sqrt{M}$, and therefore it may be said that, as seen from Equation 29, the movement required at the final image plane is proportional to the change in the quantity $$\left[\frac{K'}{\sqrt{M}} + \sqrt{M}\right]$$

where this K' is another suitable constant similarly derived. The movement of the final image plane may be effectively accomplished, without actual movement at the image plane, by the image-plane motion compensator 4, as described below.

From the foregoing it is evident that the complete movements required of all the components of the invention for a change in the overall magnification may be provided by only two drive mechanisms, one of which operates to an extent proportional to the change in the quantity $$\frac{1}{\sqrt{M}}$$

and the other to an extent proportional to the change in the quantity $\sqrt{M}$. The essential mechanism for driving the two fundamental lens groups and the image-plane motion compensator is illustrated in FIG. 2, in which components also shown in FIG. 1 are designated by the same reference characters. As shown, lens group A is secured to a movable carriage 5 which moves on a lead screw 6 driven by servo-motor 7. Similarly, lens group B is secured to a movable carriage 8 which moves on a lead screw 9 driven by servo-motor 10. Image-plane motion compensator 4 comprises fundamentally a pair of porro-mirrors 11. Porro-mirrors 11 are secured to carriage 13 which moves on lead screw 14 driven by servo-motor 15. Porro-mirrors 12 are fixed with respect to mirrors 11, and are included to reverse the direction of the light beam, as shown by the dash-dot lines. Because of the reversal of direction of the light beam it is necessary to move the porro-mirrors 11 a distance only one-half that which would be required at the final image plane. Porro-mirrors such as here referred to are well known in the art; and they may be of prism type.

It has been pointed out above that in accordance with the invention the movement of the lens group A is proportional to the change in $$\frac{1}{\sqrt{M}}$$

the movement of lens group B is proportional to the change in $$\left(\frac{K}{\sqrt{M}} + \sqrt{M}\right)$$

and that the movement of the image-plane motion compensator is proportional to the change in $$1/2\left(\frac{K'}{\sqrt{M}} + \sqrt{M}\right)$$

The fundamental movements represented by changes in $$\left(\frac{1}{\sqrt{M}}\right)$$

and $(\sqrt{M})$ may be generated from a single input movement through the use of suitable gearing, cams, levers, or other drives well known in the mechanical arts. The motive power for the movements of the separate parts thus may be provided by one or a plurality of motors, or by manual movement of suitable controls in obvious manner. In the system illustrated in FIG. 2 a separate driving motor is shown for each of the fundamental movable components, as above described. The movements of the two optical groups are such as to maintain the intermediate image 2 internal over the entire range of magnification adjustment. Although the plane of this intermediate image shifts with change of magnification, this movement is actually very little, as appears from the values in column "$v_1$" in the tabulation below.

An equivalent and alternative mechanical arrangement of the mechanism of FIG. 2 is as follows: Carriage 8 is removed from screw 9 and is secured to the frame of motor 10. Screw 9 is then extended through another threaded hole in carriage 5, so that motor 10 moves carriage 8 with respect to carriage 5. Motor 7 will then move lens groups A and B simultaneously and equally with respect to the object 1.

The electric signals or voltages required to operate carriages 5, 8 and 13 of FIG. 2 may be derived by a simple electrical computer such as schematically shown within the dotted enclosure 16. By reference to Equations 26, 28 and 29 it will be seen that the quantities $K_1$ through $K_9$ which are introduced into the computer as fixed inputs from a suitable voltage source, such as a voltage divider, are $$K_1 = f_A \qquad K_5 = f_A a$$

$$K_2 = \frac{f_A}{a} \qquad K_6 = 2f_A + 2f_B + c_1 + c_2$$

$$K_3 = 2f_A + f_B + c_1 \qquad K_7 = K_4$$

$$K_4 = \frac{f_A}{a} + \frac{f_B}{b} \qquad K_8 = f_A a + f_B b$$

$$K_9 = 1/2$$

These are known and fixed quantities because they involve only the focal lengths of the two lens groups, the separation of their principal planes, and the proportions $a$ and $b$ of the total magnification M, which are chosen for groups A and B, respectively. The required total or overall magnification M, as here shown, is introduced into the computer as a mechanical input, such as by control knob 17, in the form $(\sqrt{M})$.

A complete lens system suitable for use in an optical system such as above described in connection with FIGS. 1 and 2 is illustrated in the optical layout diagram, FIG. 3. Although more complex than many practical embodiments of the invention would require, the arrangement of optical components shown in FIG. 3 provides a highly corrected system which meets most stringent requirements, including the many advantages first above pointed out. Some of the optical refinements are here included because of the requirement of reprojecting the final image. The reprojection system represented in FIG. 3 is omitted in FIGS. 1 and 2 in order to simplify those drawings.

In FIG. 3 the first assembly 18 of optical elements, which are conventionally represented, comprises the first objective of which the function is to form the first and minified image of object space. This multiplicity of optical components is here included not only to provide the desired corrections of the various aberrations, but to comprise an inverted telephoto form, which aids in the proper placement of various pupils to permit a large diameter image to be reprojected. The exit pupil for the first objective 18 is advantageously at infinity, which conventionally is considered to be at approximately 26 times the focal length, or more. The next lens assembly 19 is included in group A and comprises the field lens associated with the first objective. Its function is to form the entrance pupil 20 for group B. As can be seen from the values given in the tabulation below, the relative motion between groups A and B is very small over the range of movements required of these two optical groups to effect a large change in magnification. Hence, it follows that the entrance pupil for group B remains substantially stationary throughout the entire magnification range.

The third assembly of optical elements comprises group B which is the second objective, of which the function is to form a magnified image of the first real image 2.

The above statement regarding the complexity of the first objective applies equally to the second objective. This, like the first objective, is of well-corrected telephoto form, in order to cause its exit pupil to be at an extreme distance, viz., substantially at infinity so that the largest variation of its rear conjugate distance is insignificant in relation to this pupil distance. Thus, the pupil next formed, which is the entrance pupil 31 for the reprojection system 21 will remain substantially stationary.

The reprojection system represented in FIG. 3 is of type well-known in the art and requires no detailed description. It will be seen that the image 3 is here formed near the field lens 22, and that the plane of this image is maintained in fixed position by means of the compensator 4, as previously explained. Field lens 22 forms the entrance pupil 31 for the reprojection system 21. Pupil 31 may comprise a finite aperture stop, as here represented. Mirror 23 is included for convenience to direct the light beam into the reprojection system. Final image 24 is thus formed on screen 25. With the optical system here shown, this final image can be varied over a magnification range of approximately 1 to 25, merely by appropriate adjustment of the three fundamental movable elements as above described. In the example illustrated this magnification range takes place around a nominal value of $M=1$. The system could be arranged to effectively operate around a different nominal value by choosing an appropriate magnification (greater or less than unity) for the reprojection portion of the system.

The dimensions in the tabulation given below refer to the symbols in FIGS. 1 and 2 and the discussion thereof. They relate to a practical embodiment of the invention as illustrated in FIG. 3. From these dimensions it will be seen that the necessary movements of the lens groups and of the image plane, or of the compensator if included, involve entirely practicable magnitudes. Furthermore, in this example the magnification range includes minification, viz., values less than unity.

| M | $u_1$ | $v_1$ | $u_1+v_1$ | $u_2$ | $v_2$ | $u_2+v_2$ | $a_4$ |
|---|---|---|---|---|---|---|---|
| 5.4153 | 2.38014 | 1.72458 | 4.10472 | 2.26760 | 16.94762 | 19.21522 | 23.31994 |
| 4.0615 | 2.59366 | 1.62750 | 4.22116 | 2.30900 | 14.94522 | 17.25422 | 21.47538 |
| 3.2492 | 2.78174 | 1.56126 | 4.34300 | 2.34546 | 13.57844 | 15.92390 | 20.26690 |
| 2.2720 | 3.10820 | 1.47434 | 4.58254 | 2.40876 | 11.78580 | 14.19456 | 18.77710 |
| 1.6246 | 3.51978 | 1.39686 | 4.91664 | 2.48856 | 10.18728 | 12.67584 | 17.59248 |
| 1.1211 | 4.03324 | 1.32968 | 5.36292 | 2.58814 | 8.80114 | 11.38928 | 16.75220 |
| 1.0000 | 4.21172 | 1.31136 | 5.52308 | 2.62272 | 8.42344 | 11.04616 | 16.56924 |
| 0.8213 | 4.56354 | 1.28062 | 5.84416 | 2.69092 | 7.78932 | 10.48024 | 16.32440 |
| 0.5415 | 5.36434 | 1.22914 | 6.59348 | 2.84628 | 6.72658 | 9.57286 | 16.16634 |
| 0.4062 | 6.03956 | 1.19844 | 7.23800 | 2.97700 | 6.09414 | 9.07114 | 16.30914 |
| 0.3249 | 6.63444 | 1.17748 | 7.81192 | 3.09252 | 5.66126 | 8.75378 | 16.56570 |
| 0.2708 | 7.17208 | 1.16202 | 8.33410 | 3.19660 | 5.34280 | 8.53940 | 16.87350 |
| 0.2312 | 7.66668 | 1.15000 | 8.81668 | 3.29255 | 5.09466 | 8.38720 | 17.20388 |
| 0.2166 | 7.90083 | 1.14491 | 9.04574 | 3.33801 | 4.98951 | 8.32752 | 17.37326 |

$f_A=1; f_B=2.$
Dimensions are in any consistent units.

The optical diagram shown in FIG. 4 is basically similar to that of FIG. 1 and therefore requires no detailed explanation. Some of the reference characters and dimension symbols have been repeated with double-prime designations to show the correspondence between the two figures. Although FIG. 4 is not drawn to scale with respect to FIG. 1, it is intended to illustrate the relative positions of the corresponding components to provide a magnification of unity—which is a condition having practical significance to those skilled in the art.

A second modification of the system of the invention is illustrated in FIG. 5. Although this system as a whole is equivalent to the fundamental system of FIG. 3, and for some purposes can be similarly employed, as in FIG. 2, it is simplified in that the field lens 19 of FIG. 3 is omitted. Also, the objective B' which corresponds to group B of FIG. 3 is reversed. By thus operating the objectives back to back, some of the aberrations cancel each other, permitting some relaxation of the corrections otherwise required of the individual optical assemblies.

Although the simplification noted in FIG. 5 is often desirable, it also introduces certain limitations in the system. For example, its use is restricted in that the second image must be used directly at its image plane. If this image were reprojected, changes in magnification would introduce undesirable vignetting. However, where reprojection is not required, this simplified lens arrangement of FIG. 5 has considerable utility.

The third alternative modification of the invention is illustrated in FIG. 6, which appears on the first sheet of the drawings. While this embodiment has the same inherent limitations as that of FIG. 5, it has the additional advantage of further simplification of the optics. It is obviously much simpler than the optical systems of FIG. 3 and FIG. 5, but, like them, can be used in the arrangement of FIG. 2. In this embodiment, field lenses 26 and 27 are included, one in each group, but the objectives are, as shown, simplified to such an extent as to more than outweigh the addition of the field lenses. The lens assemblies in the two groups A″ and B″ are disposed back to back as in FIG. 5. Here, the objective lenses 28 and 29 can comprise doublets of reasonably simple construction and of small size, but the field lenses must be approximately the same size as the intermediate image 30, which corresponds to image 2 of the previous figures. The basic principles and rules described in respect to FIGS. 1, 2 and 3 also apply to the above-described modifications.

In the embodiments described herein the invention is shown as operating upon an object at a finite conjugate distance. It is evident that this object need not necessarily be a real object but can be the real or virtual image of an infinitely distant object formed by an optical system placed in front of any of the systems herein described. The invention is thus generally applicable to near or distant objects.

The foregoing specification describes certain applications of the invention by way of example, but it is to be understood that no limitation is thereby intended because the invention has wide application and is limited only by the scope of the appended claims.

We claim:

1. A variable magnification optical system, including first and second groups of optical components spaced apart along a common optical axis, the positions of the components in each said group being fixed relative to each other, the first group comprising essentially an objective with respect to an object located in a fixed object plane before it, means in said first group for forming a real minified image of said object in a first image plane within said groups, the second group comprising essentially an objective with respect to said real image, means in said first group for forming an entrance pupil for said second group, means in said second group for forming a second and magnified image of said minified image in a second image plane, and means for continously varying the magnification of the second image over a large magnification range which comprises means for continuously adjusting the distance between the object plane and said first group and for continuously adjusting the distance between the object plane and said second group such that said first image plane always lies within said groups, and said entrance pupil for the second group remains substantially stationary in respect to the second group throughout said variation over a large magnification range.

2. A system according to claim 1, which includes means for adjusting the optical distance between the object plane and said second image plane to maintain the focus of the final image.

3. A system according to claim 1 in which the optical components of the first and second groups are proportioned and arranged such as to form an exit pupil for the second group substantially at infinity, and to form an entrance pupil for the second group between said first image plane and said second group.

4. A system according to claim 1 in which the optical components of the first and second groups are proportioned and arranged such as to form an exit pupil for the second group substantially at infinity, to form a real reduced image of the object at said first image plane of which the conjugate distance is less than the distance of the object plane from the first group, and to form a magnified image of said object at said second image plane of which the conjugate distance is greater than the distance of said first image plane from said second group.

5. A variable magnification optical system including first and second groups of optical components spaced apart along a common optical axis, the positions of the components in each said group being fixed relative to each other, the first group comprising essentially an objective with respect to an object located in a fixed object plane before it, means in said first group for forming a real image in a first image plane within said groups, the second group comprising essentially an objective with respect to said real image, means in said first group for forming an entrance pupil for said second group, means in said second group for forming a second image in a second image plane, and means for varying the magnification (M) of the second image over a large magnification range which comprises first movable means for adjusting the distance between the object plane and said first group by moving said first group to an extent proportional to the change in $$\left(\frac{1}{\sqrt{M}}\right)$$

and second movable means for adjusting the distance between the object plane and said second group by moving said second group to an extent proportional to the change in $$\left(\frac{K}{\sqrt{M}}+\sqrt{M}\right)$$

where "K" is a constant, and said entrance pupil for the second group remains substantially stationary in respect to the second group throughout said variation over a large magnification range.

6. A system according to claim 5 which includes third movable means for changing the optical distance between the object plane and said second image plane by an extent proportional to the change in $$\left(\frac{K^1}{\sqrt{M}}+\sqrt{M}\right)$$

whereby to maintain the focus of the magnified image.

7. A system according to claim 5 which includes third movable means for changing the optical distance between the object plane and said second image plane, which comprises an image-plane motion compensator having an element of the porro-mirror type which moves to an extent proportional to the change in $$1/2\left(\frac{K^1}{\sqrt{M}}+\sqrt{M}\right)$$

with respect to the object plane.

8. A system according to claim 5 in which the components of said groups are proportioned and arranged to form an exit pupil for the second group substantially at infinity.

9. A system according to claim 5 in which said first group includes a field lens disposed on said optical axis so as to form an entrance pupil for the second group objective, said entrance pupil being located between said first image plane and said second group.

10. A variable magnification reprojection optical system having an extremely wide range of useful magnification for a large field of view and wide aperture, which includes first and second optical lens groups spaced apart along a common optical axis, the positions of the components in each said group being fixed relative to each other, the first group comprising essentially an objective with respect to an original object located in a fixed object plane before the first group, means in said first group for forming a real image in a variable first image plane within said groups, said second group comprising essentially an objective with respect to said real image, a field lens disposed on said optical axis in said first group behind the objective thereof so as to form an entrance pupil for the second group objective, said field lens being located between said first image plane and said second group, means in said second group for forming in a second image plane a second image of which said first image is the object, a fixed field lens near which said second image plane lies, an image-plane motion compensator having a movable optical element interposed on said optical axis between said second group and said fixed field lens, said compensator by movement of its element along said axis being adapted to maintain said second image plane in fixed position, an optical reprojection system disposed on said axis behind said fixed field lens, said fixed field lens being thereby adapted to form an entrance pupil for said reprojection system, said reprojection system being adapted to reproject an image of the original object, and means for varying the overall magnification (M) of the reprojected image over a wide range, comprising first means for moving said first lens group along said axis to an extent proportional to the change in $$\left(\frac{1}{\sqrt{M}}\right)$$

second means for moving said second lens group along said axis to an extent proportional to the change in $$\left(\frac{K}{\sqrt{M}}+\sqrt{M}\right)$$

and third means for moving the movable optical element of said compensator along said axis to an extent proportional to the change in $$1/2\left(\frac{K'}{\sqrt{M}}+\sqrt{M}\right)$$

where "K" and "K'" are constants.

11. A system according to claim 10 in which both said groups have entrance pupils and both said groups include lenses of positive refracting power and negative refracting power, the lenses of negative refracting power of both groups being concentrated towards their respective entrance pupils and the lenses of positive refracting power of both groups being concentrated away from their respective entrance pupils.

12. A system according to claim 10 which includes unicontrol means operably interconnecting said first, second and third means to actuate the same simultaneously and thereby to effectuate said movements in response to a single adjustment of said unicontrol means representing a predetermined magnification value.

13. A variable magnification optical system including first and second optical lens groups spaced apart along a common optical axis, the positions of the components in each said group being fixed relative to each other, the first group comprising essentially an objective and a field lens and the second group comprising essentially a field lens and an objective disposed in the order named, said first group being adapted to form in a variable focal plane within said groups a real image of an object located in an object plane before it, the lenses of said first group being disposed and arranged to form an exit pupil for said first group substantially at infinity, the lenses in said second group being adapted to form in a second image plane a second image of which said first image is the object, the lenses in said second group also being arranged to form an entrance pupil substantially at infinity, and means for varying the magnification (M) of the second image over a large magnification range which comprises means for moving said first group along said axis to an extent proportional to the change in $$\left(\frac{1}{\sqrt{M}}\right)$$

means for moving said second group along said axis to an extent proportional to the change in $$\left(\frac{K}{\sqrt{M}}+\sqrt{M}\right)$$

and means for varying the effective optical distance between the object plane and said second image plane to maintain the focus of said second image, where each "K" is a constant.

14. A variable magnification optical system, including first and second groups of optical components spaced apart along a common optical axis, the positions of the components in each said group being fixed relative to each other, the first group comprising essentially an objective with respect to an object located in an object plane before it, means in said first group for forming a real image in a first image plane within said groups, the second group comprising essentially an objective with respect to said real image, means in said second group for forming a second and magnified image in a second image plane, the optical components of the first and second groups, including a field lens disposed on said optical axis being so proportioned and arranged as to form an entrance pupil for the second group objective, said entrance pupil being located between said first image plane and said second group, and means for varying the magnification of the second image over a large magnification range which comprises means for adjusting the distance between the object plane and said first group and the distance between the object plane and said second group such that said first image plane always lies within said groups.

15. A variable magnification optical system, including first and second groups of optical components spaced apart along a common optical axis, the positions of the components in each said group being fixed relative to each other, the first group comprising an objective with respect to an object located in an object plane before it, means in said first group for forming a real image in a first image plane within said groups, the second group comprising essentially an objective with respect to said real image, means in said second group for forming a second and magnified image in a second image plane, the optical components of the first and second groups being so proportioned and arranged as to form an entrance pupil for the second group between said first image plane and said second group, and means for varying the magnification of the second image over a large magnification range which comprises means for adjusting the distance between the object plane and said first group and the distance between the object plane and said second group such that said first image plane always lies within said groups, the optical components of the first and second groups being proportioned and arranged so as to form an exit pupil for the second group effectively at infinity, to form a real reduced image of the object at said first image plane, and to form a magnified image of said reduced image at said second image plane.

16. A variable magnification optical system including first and second optical lens groups spaced apart along a common optical axis, the positions of the components in each said group being fixed relative to each other, means for moving said first group along said axis to an extent proportional to the change in $$\frac{1}{\sqrt{M}}$$

and means for moving said second group along said axis to an extent proportional to the change in $$\frac{K}{\sqrt{M}}+\sqrt{M}$$

where (M) is the overall magnification of the system and (K) is a constant, the first group comprising essentially an objective with respect to an object located in an object plane before it, and means in said first group for forming a real image in a first image plane within said groups, the second group comprising essentially an objective with respect to said real image, said second group being adapted to form in a second image plane behind said second group a second image of which said first image is the object, said groups having entrance pupils and exit pupils, and the lenses in both said groups being proportioned and arranged so as to form an exit pupil for the first group substantially at infinity and an entrance pupil for the second group substantially at infinity, so that said pupils remain relatively fixed during relative movement of said groups.

17. A system according to claim 16 in which both of said groups have lenses of positive refracting power and lenses of negative refracting power, the first group having negative power concentrated toward the entrance pupil of the first group and positive power concentrated away from the entrance pupil of the first group, and the second group has negative power concentrated toward the exit pupil of the second group and positive power concentrated away from the exit pupil of the second group.

18. A variable magnification optical system including first and second groups of optical components spaced apart along a common optical axis, the positions of the components in each said group being fixed relative to each other, the first group comprising essentially an objective with respect to an object located in a fixed object plane before it, means in said first group for forming a real image in a first image plane within said groups, the second group comprising essentially an objective with respect to said real image, means in said first group for forming an entrance pupil for said second group, means in said second group for forming a second image in a second image plane, and means for varying the magnification (M) of the second image over a large magnification range which comprises first movable means for adjusting the distance between the object plane and said first group by moving said first group to an extent proportional to the change in $$\left(\frac{1}{M^N}\right)$$

and second movable means for adjusting the distance between the object plane and said second group by moving said second group to an extent proportional to the change in $$K\left(\frac{1}{M^N}\right)+K'\left(\frac{1}{M^{1-N}}\right)+M^N$$

where (K) and (K') are constants and (N) is any real number which remains constant, and said entrance pupil for the second group remains substantially stationary in respect to the second group throughout said variation over a large magnification range.

19. A system according to claim 18 which includes third movable means for changing the optical distance between the object plane and said second image plane by an extent proportional to the change in $$\left[K_1\left(\frac{1}{M^N}\right)+K_2\left(\frac{1}{M^{1-N}}\right)+K_3M^N+M^{1-N}\right]$$

where $K_1$, $K_2$ and $K_3$ are constants, whereby to maintain the focus of the magnified image.

20. A system according to claim 18 in which the components of said groups are proportioned and arranged to form an exit pupil for the second group substantially at infinity.

21. A system according to claim 18 in which said first group includes a field lens disposed on said optical axis so as to form an entrance pupil for the second group objective, said entrance pupil being located between said first image plane and said second group.

References Cited in the file of this patent
UNITED STATES PATENTS

| | | |
|---|---|---|
| 984,929 | Kellner | Feb. 21, 1911 |
| 2,068,829 | Van Albada | Jan. 26, 1937 |
| 2,313,460 | Warmisham | Mar. 9, 1943 |
| 2,391,430 | Macek | Dec. 25, 1945 |
| 2,510,419 | Ross | June 6, 1950 |
| 2,519,760 | Hett | Aug. 22, 1950 |
| 2,536,718 | Brandon | Jan. 2, 1951 |
| 2,719,457 | Tripp | Oct. 4, 1955 |
| 2,838,601 | Cavanagh | June 10, 1958 |
| 2,838,889 | Lankes | June 17, 1958 |
| 2,899,862 | Baker | Aug. 18, 1959 |
| 2,959,099 | Billard et al. | Nov. 8, 1960 |

FOREIGN PATENTS

| | | |
|---|---|---|
| 1,124,701 | France | July 2, 1956 |
| 519,940 | Great Britain | Apr. 10, 1940 |